UNITED STATES PATENT OFFICE.

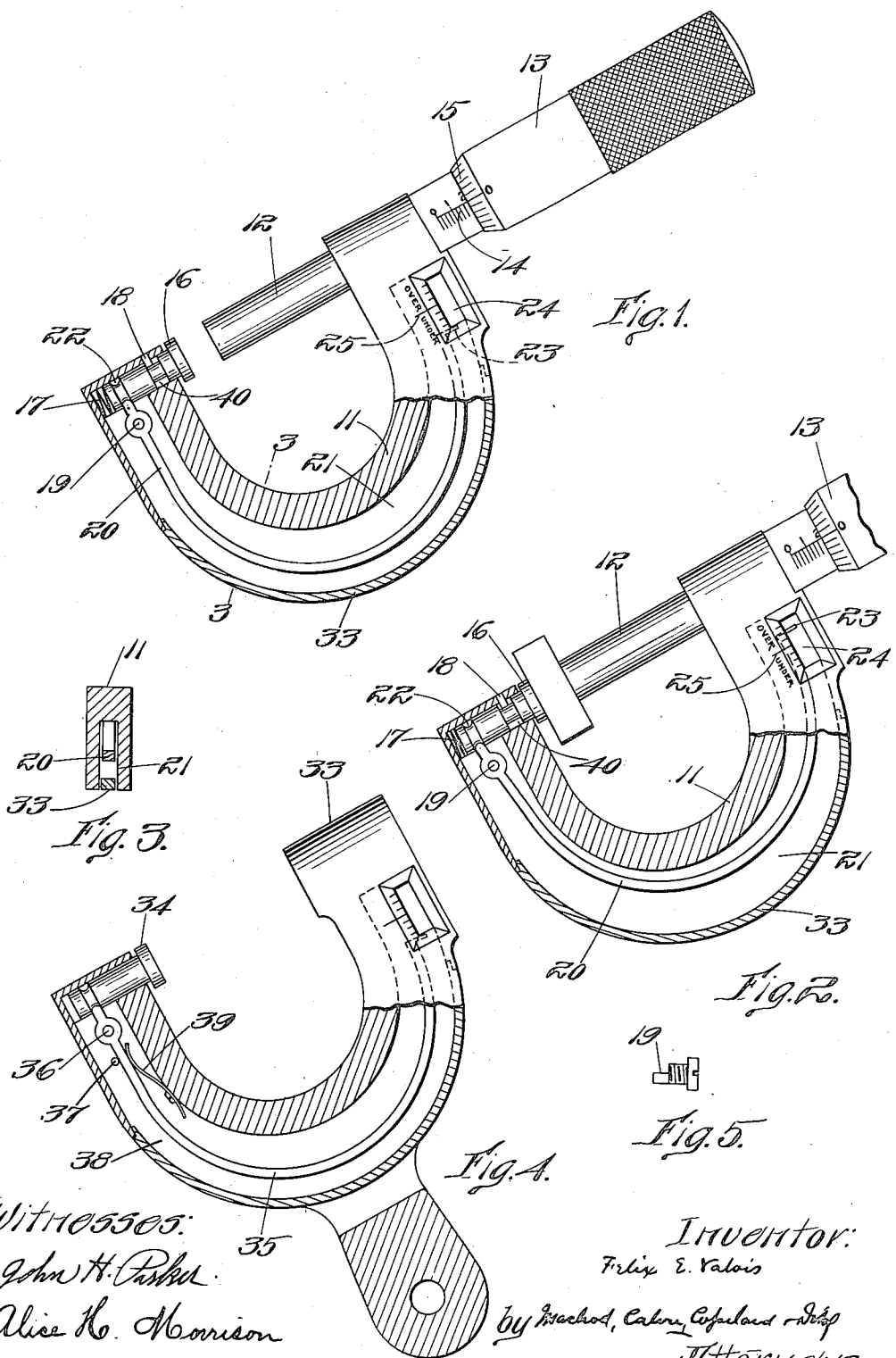

FELIX EMILE VALOIS, OF HAVERHILL, MASSACHUSETTS.

MICROMETER-CALIPERS.

1,144,623.　　　　Specification of Letters Patent.　　Patented June 29, 1915.

Application filed February 20, 1914. Serial No. 820,055.

*To all whom it may concern:*

Be it known that I, FÉLIX E. VALOIS, citizen of the United States, residing at Haverhill, county of Essex, State of Massachusetts, have invented a certain new and useful Improvement in Micrometer-Calipers, of which the following is a specification, reference being had therein to the accompanying drawings.

My invention relates to micrometer calipers of the kind ordinarily employed in machine shops to measure accurately the thickness of articles. As is well known to those skilled in this art, the accuracy of micrometer calipers depends largely on the nicety of touch of the person using the caliper and two persons using the same instrument will not always arrive at the same results. I am aware that heretofore attempts have been made to obviate the necessity of skill on the part of the person using the instrument, but, so far as known to me such attempts have not proved altogether successful.

My invention therefore has for one object to provide a caliper by the use of which the same measurement will be obtained regardless of the skill of the person using it.

A second object of my invention is to provide a caliper by means of which a series of similar pieces may be rapidly measured and the amount of the variation in size may be determined without resetting the caliper after measuring each piece as is now necessary.

Calipers embodying my invention are simple and inexpensive, and are capable of making a very accurate measurement.

My invention will be understood by reference to the following specification taken in connection with the accompanying drawings, and the novel features thereof are pointed out and clearly defined in the claim at the close of this specification.

Referring to the drawings, Figure 1 is a view of micrometer calipers embodying my invention, being partly in section for the purpose of illustrating the interior construction. Fig. 2 shows the same calipers with the parts in the position occupied by them during the measurement of a piece which is 2-1000ths over-size. Fig. 3 is a section on line 3—3 of Fig. 1. Fig. 4 is a view in modified form showing a caliper gage, embodying my invention, said gage being partly in section for the purpose of illustrating the interior construction. Fig. 5 is a detailed view enlarged of the adjustable pivot pin.

In the drawings, at 11 is shown the yoke of the calipers, at 12 the movable post, and at 13 the rotatable handle by which the post 12 is moved in the process of measurement. At 14, is indicated the usual fixed scale and at 15 is shown the scale on the rotating handle 13. These parts are all of the old and well known construction.

Opposite the movable post 12 is a bed-member or abutment 16 slidably mounted in the yoke 11 and held by the spring 17 as near to the movable post 12 as is permitted by the stop 18, the end of which enters the slot 40.

At 19 is pivoted a long crescent-shaped lever 20 lying in a slot 21 in the yoke, as will be clearly seen from Figs. 1, 2 and 3. The slot 21 is closed by a strip of metal 33 engaging the yoke at its ends and called for convenience a cover. The cover 33 is formed at its ends as shown in the drawings and engages the corresponding portions of the yoke being held in engagement therewith by the resiliency of the metal of which the cover is constructed. The short end of the lever 20 engages a groove 22 in the bed-member or abutment 16 and the long or free end of the lever 20 terminates in an indicator point 23 located adjacent a graduated slot 24 in the yoke forming a scale. The indicator point 23 is formed by bending the free end of the lever so that this portion of the lever will lie at right angles to the scale. It will therefore be seen that any movement of the bed-member 16 is communicated to the lever 20 and the amount of this movement will be measured by the calibrations on the scale. As the long arm of the lever 20 is many times the length of the short arm, the movement of the bed lever is correspondingly magnified so that the marks from the calibrations may be widely separated and therefore easily read. About the center of the slot 24 is placed a mark 25 which is the "zero-mark" and the calibrations on opposite sides of this mark indicate the amount over or undersize as the case may be, said zero-mark 25 being placed at the point occupied by the indicator point 23 when the piece being measured is of the exact thickness desired.

The pivot 19 of the crescent-shaped lever 20 is preferably made adjustable so that the indicator may be accurately adjusted. For this purpose I prefer to employ a screw 40 (see Fig. 5) having an eccentric pin 19 formed thereon which constitutes the pivot of the lever 20. It will be seen that by turning this screw slightly in the proper direction, the position of the fulcrum of the lever will be moved and a corresponding change in the position of the pointer end of the lever will be produced. In this way the pointer may be set at zero and any inaccuracy in this part of the instrument due to wear and the like, may be easily corrected.

The parts are so arranged that when there is no pressure on the bed-member 16 the indicator point 23 is off the zero-mark 25, and the proper pressure on the piece to be measured is determined by turning the handle 13 until sufficient pressure is exerted on the spring 17 to move the indicator to the zero-mark. It will also be understood that the instrument is properly calibrated so that the scale will indicate accurately corresponding differences in thickness of the pieces to be measured. In the instruments shown in the drawings the scale is calibrated to indicate thousandths of an inch. It will be seen that when a piece to be measured is interposed between the bed-member and the movable post 12 and the handle 13 is turned until the post 12 contacts with the piece and holds it against the bed-member, the pressure of the post on the piece and of the piece on the bed-member is determined solely by the strength of the spring 17, and not by the nicety of touch of the operator. It will therefore be seen that different persons using the same instrument will obtain the same results because the same pressure will always be applied to the piece.

When it is desired to measure a series of pieces of the same size, the handle 13 is set to the exact size required and the piece to be measured is inserted between the bed-member 16 and the movable post 12. This may be done easily after the handle has been set because the bed-member 16 will yield sufficiently to permit the insertion of the piece. If a piece is of exactly the right size the indicator point 23 will be at the zero-mark 25. If however the piece is 2-1000ths over-size the pointer will be moved a corresponding distance beyond the zero-mark 25 i. e. to the position shown in Fig. 2; likewise if the piece is under-size the amount will be shown by the pointer. In the drawings, I have shown the pointer as having a range of 6-1000ths—3-1000ths above and 3-1000ths below the exact size. I have done this because this is the variation in size permitted in many shops in the manufacture of small parts.

In Fig. 4, I have shown a well known form of standard caliper gage 43 provided with the device embodied in my invention, the arrangement and construction of which is practically identical with that shown in the micrometer calipers. I provide a bed-member 34 which coöperates with a crescent-shaped lever 35 having an adjustable pivot 36. There is here shown, however, a slightly different spring and stop construction for actuating the bed-member and limiting its movement. It consists of a stop pin 37 secured within the pocket 38 of the caliper gage relatively close to the pivot 36 and adjacent the crescent-shaped lever 35. The relation of the stop pin 37 to the lever 35 is such that the pin engages the edge of the lever 35 when the bed-member 34 has projected from the gage a predetermined amount. It will thus be seen that the movement of the bed-member 34 is limited by the crescent-shaped lever 35. I have provided for its actuation also by the lever 35 by means of a spring 39 secured at one end to the edge of the pocket 38 and pressing against the lever 35 with the other end thereby tending normally to hold it in contact with the stop pin 37. It will be seen that the caliper gage described will indicate the amount of error under or over the proper size so that the workman may note the amount. While I have shown a different type of stop pin and spring construction in Fig. 4 from that shown in the micrometer calipers illustrated in the other figures, it is obvious that either construction may be employed.

I regard the device shown in Fig. 4 as important for the reason that standard caliper gages are used extensively for manufacturing purposes. Gages embodying my invention may be made in convenient standard sizes for shop use and are far more valuable than the old standard caliper gage heretofore in use for they will ascertain the amount of the error and, therefore, will help the machinist to more readily and quickly turn out the material of the desired size. Furthermore, I have found that the caliper gage as now used tends to wear out quickly for gages of this type receive hard usage and much wear from constantly being fitted over the material measured. The yieldingly mounted bed-member employed in my device, however, minimizes the wear and what wear does occur may be quickly corrected by the adjustment pin as described. Furthermore, much of the workman's time is saved by my instrument for the exact error of the work is indicated.

While I have shown my device applied to an external caliper gage it will be readily seen that it may be adapted for use in an internal caliper gage of any well known form and construction.

What I claim is:

The improved measuring instrument comprising a crescent-shaped yoke having a slot extending substantially throughout the length thereof, an adjustable post mounted transversely of one end of said crescent-shaped yoke, a movable bed-member mounted transversely of the opposite end of said yoke, a single lever within the slot in said yoke pivotally mounted near said bed-member engaging with said bed-member at one end and having a free end with an indicator thereon, said lever being of a crescent-shape to conform with the shape of said yoke and having a movement at the end in engagement with said bed-member substantially transversely of said yoke and parallel with the movement of said bed-member and having a movement at the indicator end substantially longitudinally of said yoke and at right angles with the movement of said bed-member, and a scale on said yoke adjacent said post coöperating with the indicator end of said lever having a line of marking substantially parallel with the movement of said indicator end and at right angles with the movement of said bed-member.

In testimony whereof I affix my signature, in presence of two witnesses.

FÉLIX EMILE VALOIS.

Witnesses:
E. L. Moss,
Arthur A. Morel.